United States Patent
Bartolome et al.

(10) Patent No.: US 8,100,338 B2
(45) Date of Patent: Jan. 24, 2012

(54) DATA ENCODING PATTERN

(75) Inventors: Emiliano Bartolome, Santa Cristina (ES); Manuel Gonzalez, Malaga (ES); Andreu Gonzalez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 776 days.

(21) Appl. No.: 11/666,494

(22) PCT Filed: Oct. 14, 2005

(86) PCT No.: PCT/EP2005/055273
§ 371 (c)(1),
(2), (4) Date: Oct. 9, 2008

(87) PCT Pub. No.: WO2006/045711
PCT Pub. Date: May 4, 2006

(65) Prior Publication Data
US 2009/0057419 A1    Mar. 5, 2009

(30) Foreign Application Priority Data
Oct. 29, 2004   (GB) .................................. 0423994.3

(51) Int. Cl.
*G06K 19/06*    (2006.01)

(52) U.S. Cl. ........................................................ 235/494
(58) Field of Classification Search .................. 235/494, 235/462.01
See application file for complete search history.

(56) References Cited

U.S. PATENT DOCUMENTS

| | | | |
|---|---|---|---|
| 4,686,329 A | 8/1987 | Joyce | |
| 5,291,296 A | 3/1994 | Hains | |
| 5,305,118 A | 4/1994 | Schiller et al. | |
| 5,852,434 A * | 12/1998 | Sekendur | 345/179 |
| 6,502,756 B1 * | 1/2003 | F.ang.hraeus | 235/494 |
| 6,629,746 B2 | 10/2003 | Waldner et al. | |
| 6,674,427 B1 * | 1/2004 | Pettersson et al. | 345/179 |
| 6,929,186 B2 * | 8/2005 | Lapstun | 235/494 |
| 7,387,261 B2 * | 6/2008 | Onishi | 235/494 |
| 2004/0035935 A1 | 2/2004 | Sadao | |

FOREIGN PATENT DOCUMENTS

| | | |
|---|---|---|
| EP | 0 998 126 | 5/2000 |
| WO | 03/001442 | 1/2003 |

* cited by examiner

*Primary Examiner* — Seung Lee

(57) ABSTRACT

A product 100 having a data encoding pattern 108 printed on it, the pattern defining a grid having a grid spacing, wherein the grid spacing has discontinuities arranged to compensate for a mismatch between the resolution at which the pattern 108 is printed and a required value for the grid spacing, the discontinuities being irregularly spaced across the product.

23 Claims, 5 Drawing Sheets

DATA ENCODING PATTERN

FIELD OF THE INVENTION

The present invention relates to the generation and processing of data encoding patterns, and has particular application in position identification patterns for application to a document or other product. Such patterns are made up of markings on the product, which can be detected by a suitable detection system and used to identify positions on the product, for example to detect pen strokes on a document. The document may be a form or other printable document such as a label or note pad.

BACKGROUND TO THE INVENTION

It is known to use documents having such position identification markings in combination with a pen having an imaging system, such as a CMOS camera, within it, which is arranged to image a small area of the page close to the pen nib, which is illuminated by an infra red LED. The IR wavelength is chosen as it is reflected by carbon based black ink. The pen includes a processor having image processing capabilities and a memory and is triggered by a force sensor in the nib to record images from the camera as the pen is moved across the document. From these images the pen can determine the position of any marks made on the document by the pen. The pen markings can be stored directly as graphic images, which can then be stored and displayed in combination with other markings on the document. In some applications the simple recognition that a mark has been made by the pen on a pre-defined area of the document can be recorded, and this information used in any suitable way. This allows, for example, forms with check boxes on to be provided and the marking of the check boxes with the pen detected. In further applications the pen markings are analysed using character recognition tools and stored digitally as text. Systems using this technology are available from Anoto AB.

Many data encoding patterns are based on a grid structure, and it is important that the scale of the pattern is correct, so that the grid spacing conforms to the required specification. This ensures that the pattern can be read accurately by the reading device, and that, where the pattern is a position identifying pattern, the position indicated by the pattern is accurate. If offset printing is used then the pattern can be reproduced accurately and the grid spacing can be set to match the pattern specification. However, when the pattern is printed using more flexible and cheaper printers, such as a laser jet printer, the resolution of the printer may not enable it to print the marks in exactly the required position. Therefore when the printer is requested to print the marks in certain positions, the actual positions in which they are printed do not correspond exactly with the requested position, but are rounded to the closest position which is an integer multiple of the printer resolution. Typically, the error in the positions of the marks builds up across the document until it reaches about half of the printer resolution. Then the error is switched to be in the opposite direction, and from that point on it decreases across the page to zero, and then starts to build up again. The points at which the direction of the error is swapped produce visible bands on the document.

SUMMARY OF THE INVENTION

The present invention provides a product having a data encoding pattern printed on it, the pattern defining a grid having a grid spacing, wherein the grid spacing has discontinuities arranged to compensate for a mismatch between the resolution at which the pattern is printed and a required value for the grid spacing, the discontinuities being irregularly spaced across the product.

The pattern may be made up of a number of elements, preferably in an array. The grid spacing may be defined as the spacing of the elements of the pattern. The discontinuities in grid spacing may comprise discontinuities in the spacing of the pattern elements. The average grid spacing may be arranged to be substantially equal to the required grid spacing.

Corresponding methods of generating a data encoding pattern and producing a product are also provided.

Data carriers for carrying data arranged to control a computer system to carry out the methods of the invention, and to operate as a system of the invention are also provided. The data carrier can comprise, for example, a floppy disk, a CDROM, a DVD ROM/RAM (including +RW, -RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

BRIEF DESCRIPTION OF THE DRAWINGS

FIG. 6 is a table recording intersection positions used to make the pattern of FIG. 5;

DESCRIPTION OF THE PREFERRED EMBODIMENTS

Figure 1:
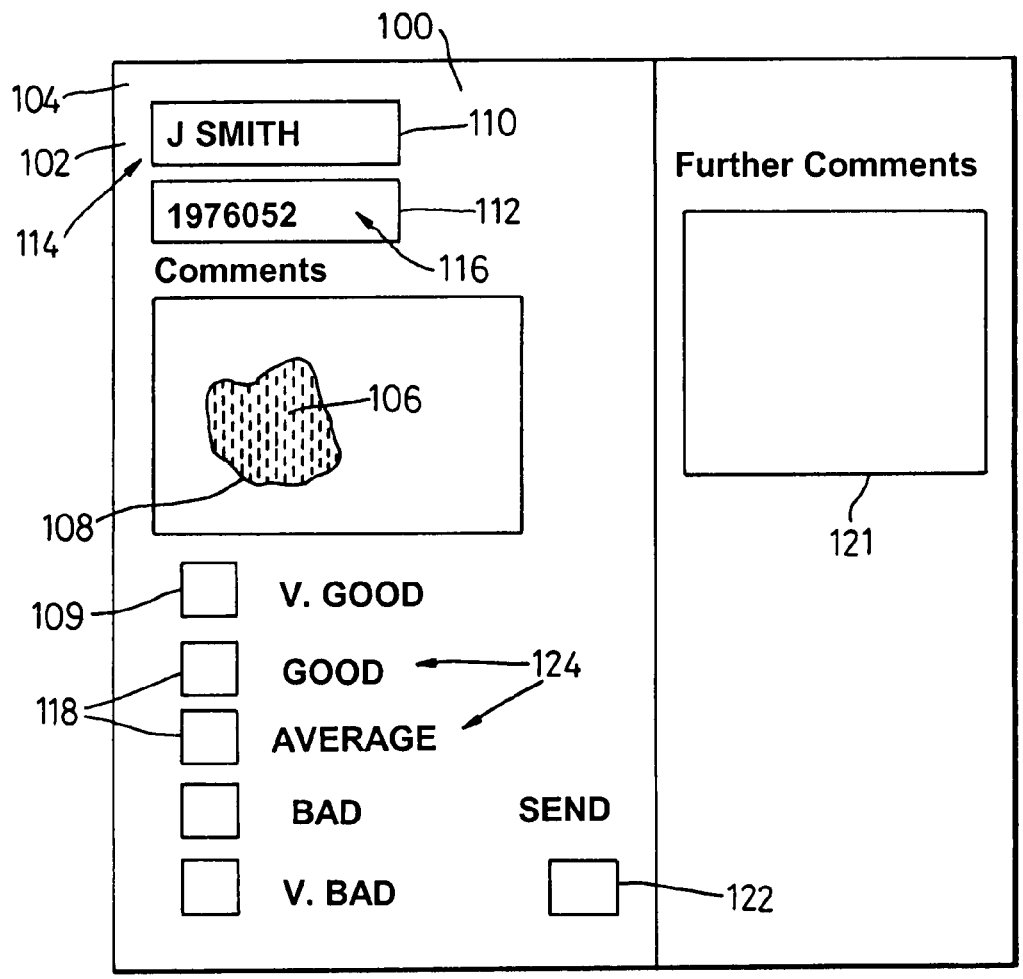
FIG. 1 shows a document according to an embodiment of the invention.

Referring to FIG. 1 a document 100 for use in a digital pen and paper system comprises a carrier 102 in the form of a single sheet of paper 104 with position identifying markings 106 printed over substantially the whole of its surface to form a position identifying pattern 108. Also printed on the paper 104 are further markings 109 which are clearly visible to a human user of the document, and which make up the content of the document 100. The content 109 will obviously depend entirely on the intended use of the document. In this case an example of a very simple two page questionnaire form is shown, and the content includes a number of boxes 110, 112 which can be pre-printed with user specific information such as the user's name 114 and a document identification number 116. The content further comprises a number of check boxes 118 any one of which is to be marked by the user, and two larger boxes 120, 121 in which the user can write comments.

The form content also includes a send box 122, to be checked by the user when he has completed the questionnaire to initiate a document completion process by which pen stroke data is forwarded for processing, and typographical information on the form such as the headings or labels 124 for the various boxes 110, 112, 118, 120. The parts of the form which the user is expected to write on or mark, that is within the check boxes 118, the comments boxes 120, 121 and the send box 122, are defined as active areas of the form, and the pattern 108 that is printed within those areas needs to be identified to allow pen strokes made within those areas of the form to be identified as described below.

Figure 2:
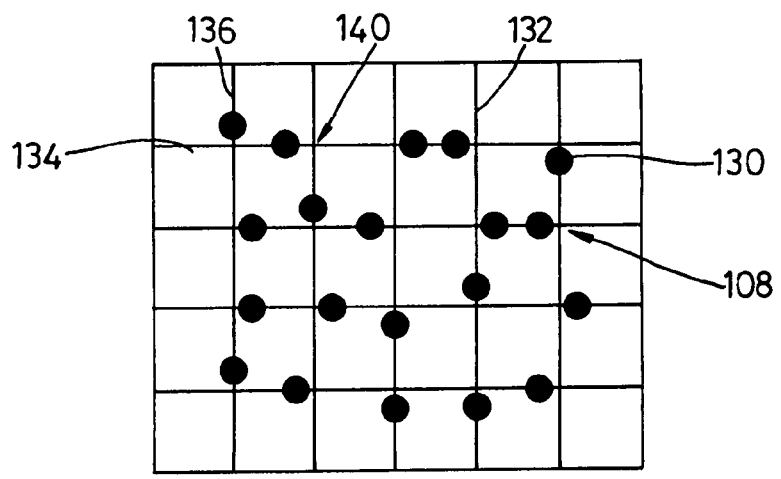
FIG. 2 shows in detail position encoding pattern on part of the document of FIG. 1.

It is envisaged that the position-identifying pattern that is printed may have many forms but one suitable example is that shown in FIG. 2. The position-identifying pattern printed on the document is made up of an array of a number of dots 130 arranged in positions based around an imaginary grid 132. The grid 132 can be considered as being made up of horizontal and vertical lines 134, 136 defining a number of intersections 140 where they cross. One dot 130 is provided at each intersection 140, but slightly offset in one of four possible directions up, down, left or right, from the actual intersection. The dot offset distance is the same for each dot, but the dot offset directions are arranged to vary in a systematic way so that any group of a sufficient number of dots 130, for example any group of 36 dots arranged in six by six square, will be unique within the pattern space. An example of this type of pattern is described in WO 01/26033. It will be appreciated that other position identifying patterns can equally be used. Some examples of other suitable patterns are described in WO 00/73983 and WO 01/71643.

Figure 3:
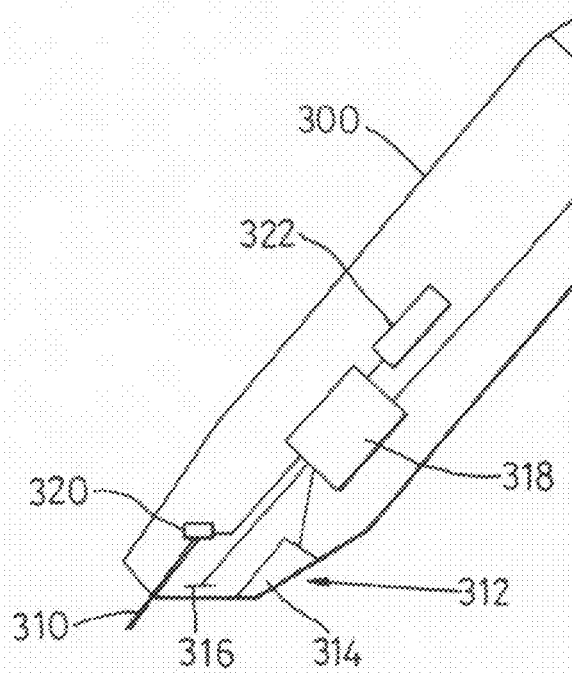
FIG. 3 shows a pen for use with the document of FIG. 1.

Referring to FIG. 3, a pen 300 for use with the document 100 comprises a writing nib 310, and a camera 312 made up of an infra red (IR) LED 314 and an IR sensitive sensor 316. The camera 312 is arranged to image a circular area adjacent to the tip 311 of the pen nib 310. A processor 318 processes images from the camera 312 taken at a predetermined rapid sample rate. A pressure sensor 320 detects when the nib 310 is in contact with the document 100 and triggers operation of the camera 312. Whenever the pen is being used on a patterned area of the document 100, the processor 318 can therefore determine from the pattern 108 the position of the nib of the pen whenever it is in contact with the document 100. From this it can determine the position and shape of any marks made on the patterned areas of the document 100. This information is stored in a memory 320 in the pen 300 as it is being used.

In this embodiment the system operates with a square grid having a nominal grid spacing of 300 μm, a nominal pattern dot diameter of 100 μm, and a nominal dot offset of 50 μm. The pattern therefore needs to be printed at close to these nominal values to ensure that it can be read by the pen 300. It will be appreciated that for any system there will be an acceptable range for each of the grid spacing, the dot offset and the dot size. These ranges will provide tolerances around the nominal values. In this case the range of acceptable grid spacings is 295 μm to 305 μm. A common example of a suitable printer has a print resolution of 600 dpi. Such a printer has a resolution of 42.33 μm. This means that it can be considered as printing in individual dots or pixels which are nominally approximately 42.33 μm square. In practice the dot spacing is exactly determined by the resolution, and is on average 42.33 μm, but the size of each pixel when printed as a dot of ink is more variable. This is because each individual printed dot will tend to be approximately circular rather than square, and will have a diameter larger than 42.33 μm. Also each dot will tend to spread beyond its nominal area into the surrounding area nominally allocated to other pixels or dots. The result of this is that the 600 dpi printer can print the pattern with a regular grid spacing of 296.33 μm, by using seven times the printer dot spacing as the pattern grid spacing.

This is within the tolerance of the pen, so that a pattern printed with a regular spacing of 296.33 μm can be read by the pen. However, because there is a mismatch between the nominal grid spacing of 300 μm that the pen is expecting and the actual grid spacing of 296.33 μm, any distances or positions calculated by the pen from the pattern will be incorrect. If the same printer resolution is used for printing all documents, then the pen, or the application using the pen stroke data, can be programmed to compensate for this. However, if printers of different resolutions are to be used, and the pen does not know the resolution of the printer used for printing any particular document, this compensation is not possible.

In order to overcome this problem, the pattern is printed with discontinuities in grid spacing which compensate for the mismatch between printer resolution and required grid spacing. In this case to increase the average grid spacing, an extra printer dot spacing needs to be introduced between adjacent grid lines at certain points in the pattern. This produces a line spacing of 8 times the printer resolution, rather than seven times. The frequency with which these discontinuities are added will determine the average grid spacing, which can therefore be controlled to be between seven and eight times the printer resolution. For example, with a 600 dpi printer, to produce a 300 μm grid spacing, one extra printer dot spacing needs to be introduced every 11.54 grid lines. In practice if two extra dot spacings are introduced every 23 grid lines, this results in an average grid spacing that is close enough to 300 μm for practical purposes.

Figure 4:
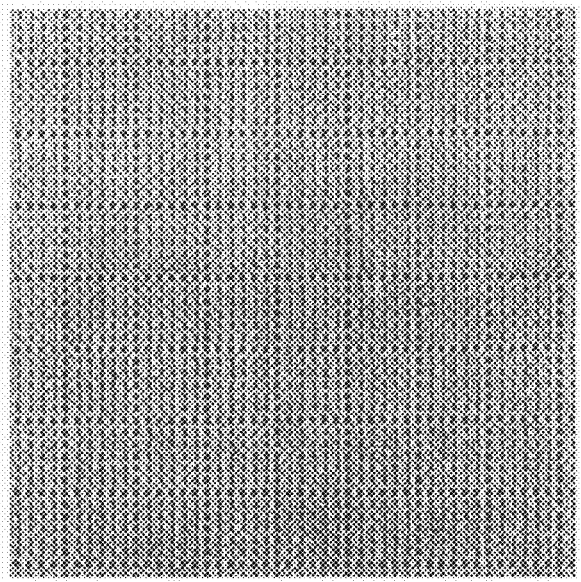
FIG. 4 shows the visual effect of regularly spaced pattern discontinuities of a prior art document.

However, as mentioned above, if these discontinuities were added at regular intervals, for example one extra dot space every 11 or 12 grid lines alternately, this produces a regular variation in the dot pattern which is obvious to the human eye. An example of a pattern having such a regular variation, though not a conventional data encoding pattern, is shown in FIG. 4.

Figure 5:
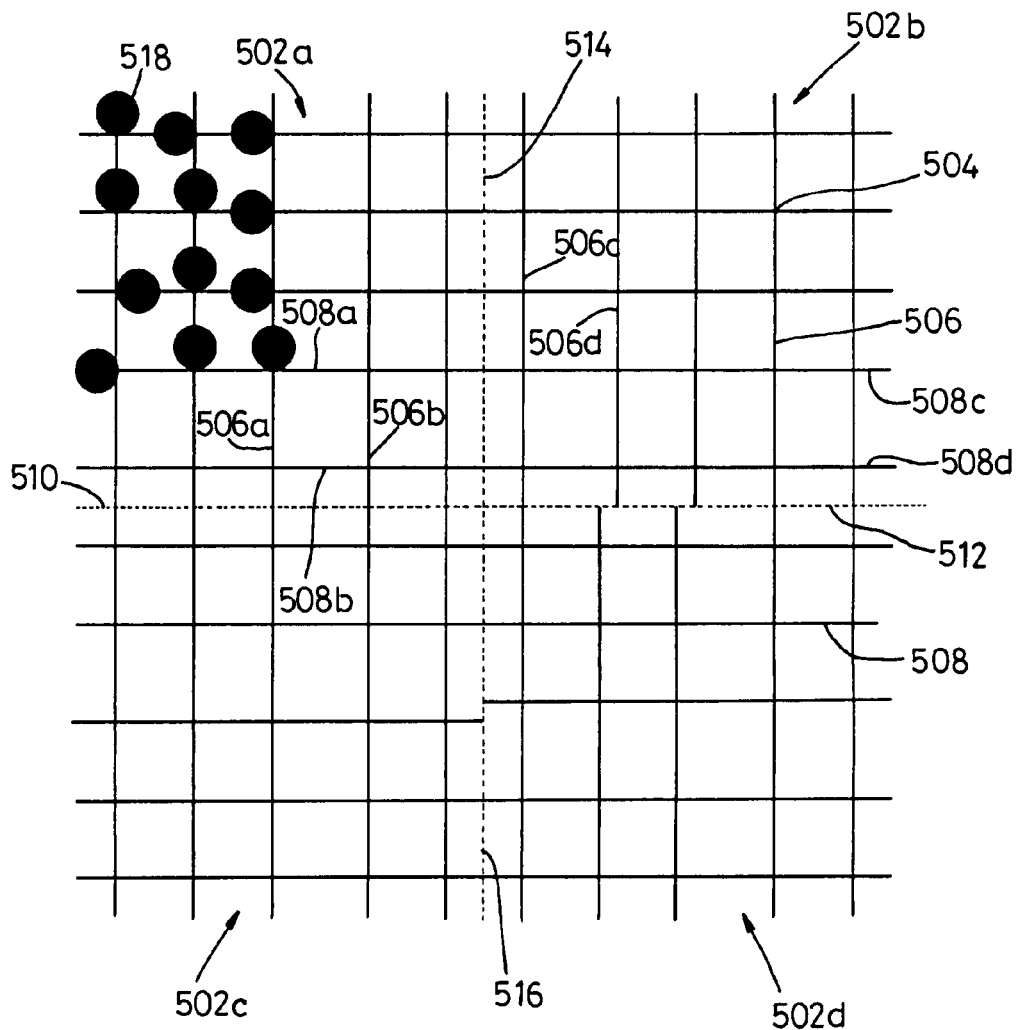
FIG. 5 is an enlarged representation of the position identifying pattern on the document of FIG. 1.

Therefore the discontinuities are introduced in an irregular manner to break up the regular variation in grid spacing. Referring to FIG. 5 the method of introducing these irregularities will now be described using a simpler grid spacing arrangement in which one larger grid spacing is required every five lines in both the horizontal and vertical directions. In this case the grid, and hence the pattern, is divided into cells 502 which are all of equal size and square, comprising a block of 25 grid intersections 504. Each cell 502 therefore has five vertical grid lines 506 and five horizontal grid lines 508. It will be appreciated that the cell size is selected so that each cell 502 has the same, integral number of discontinuities in each of the horizontal and vertical directions, in this case one of each. This means that, within each cell 502 only the positions of the spacing discontinuities need to be determined individually for each cell, the number of discontinuities being constant.

As can be seen from FIG. 5, the discontinuities are placed in different positions in each of the cells 502. In the top left hand cell 502a of the four shown, the larger spacing in the vertical lines is introduced between the third and fourth vertical lines 506a, 506b, counting from the left hand side. This divides the cell into two sets of intersections, and associated dots, one on either side of the discontinuity. Within each set, the grid spacing, and hence the dot spacing, is constant and has a first value. Between the two sets, the grid spacing, and hence the dot spacing, has a different, in this case larger, value. The discontinuity in the spacing of horizontal lines is between the fourth and fifth horizontal lines 508*a*, 508*b*, counting from the top. This divides the cell into two further sets of intersections, and associated dots, one on either side of this discontinuity. Within each set, the grid spacing, and hence the dot spacing, is constant and has a first value. Between the two sets, the grid spacing, and hence the dot spacing, has a different, in this case larger, value. In the cell 502*b*, to the right, the discontinuity in spacing of vertical lines is between the first and second vertical lines 506*c*, 506*d*, and the discontinuity in spacing of horizontal lines between the fourth and fifth horizontal lines 508*c*, 508*d*. The discontinuities in the other two cells 502*c*, 502*d* occur in other places as can be seen.

Each dot 518 of the pattern is in a position that is determined by the position of the associated grid intersection, and by the offset of the dot from the intersection. However, each dot is on either a horizontal or a vertical grid line, and offset along that line from the intersection point. Therefore defining a displacement or offset of the intersection from its nominal position is equivalent to determining a displacement of the dot position from its nominal position assuming a regular grid spacing.

Referring to FIG. 6, these discontinuities can be represented by a grid of numbers, each representing one of the grid intersections. A nominal grid intersection position is defined as being that in which the increased spacing is between one cell and the next. Starting at the top left hand corner of the pattern space, any intersection that is in the nominal position is indicated by a 0. Any intersection that is moved one printer dot spacing to the right is indicated by a 1. Any intersection that is moved one printer dot spacing down is indicated by a 2. Any intersection that is moved to the right and down is indicated by a 3. Therefore the grid pattern of the four cells of FIG. 5 can be represented using an array of numbers shown in FIG. 6. Each cell has a rectangular array of '0's in the top left corner, a rectangular array of '1's in the top right corner, a rectangular array of '2's in the bottom left corner and a rectangular array of threes in the bottom right corner. This table can also be considered as an array of dot position corrections, since the final positions of the dots in the pattern will be the same regardless of whether the corrections are applied to the grid intersections, and then the dot offsets applied to the dots, or the dot offsets are applied to give nominal dot positions, and the corrections then applied to those dot positions.

In the example of FIG. 5, the discontinuity in vertical line spacing is in the same place in the two cells 502*a* and 502*c* that are one above the other. Therefore all of the vertical lines 506 in these two cells are continuous at the boundary 510 between the two cells. However, for the two cells 502*b*, 502*d* that are also one above the other, the discontinuity in vertical line spacing is at different horizontal positions. Therefore, some, in this case two, of the vertical lines 506 through these cells have discontinuities at the boundary 512 between them. Similarly the discontinuity in spacing of the horizontal lines in the two horizontally adjacent cells 502*a*, 502*b* is in the same place, resulting in no discontinuities in the horizontal lines at the boundary 514 between them, whereas the discontinuities in spacing of the horizontal lines in the two horizontally adjacent cells 502*c*, 502*d* are in different places, resulting in discontinuities in one of the horizontal lines 508 at the boundary 516 between them.

Figure 7:
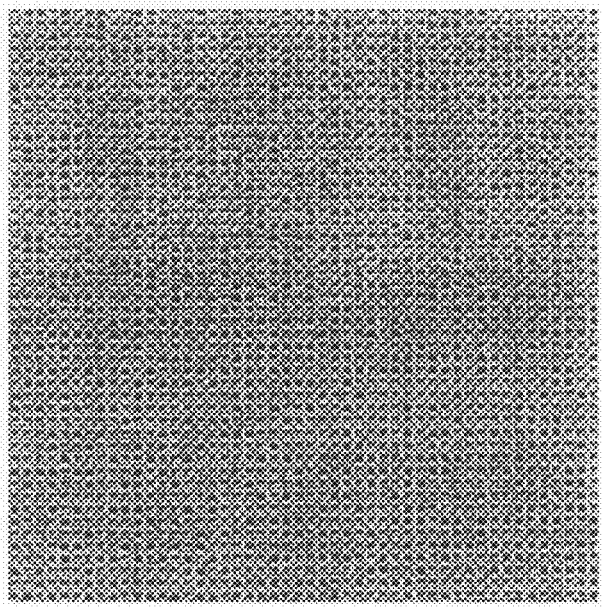
FIG. 7 shows the visual effect of the pattern of the document of FIG. 1.

It will be appreciated that, provided the positions of the spacing discontinuities differs between the cells 502 to a sufficient degree, and in a sufficiently irregular manner, a visible regular variation in the pattern will be lost, making the pattern appear more as a continuous background, and making it less distracting to a person looking at the document with it on. An example of the visual effect of the pattern of FIG. 5 is shown in FIG. 7. However, the irregularity must not be so great that it prevents the pen 300 from reading the pattern. The limits that this places on the pattern will clearly depend on a number of factors, including how big an area of the pattern the pen needs to image to determine its position, how big an area of the pattern the pen can image at one time, and the tolerances in the pattern grid spacing that can be recognized by the pen. For example, in the simple example of FIG. 5, it could be the case that the pen 300 needs to image an area of nine dots to identify its position, and can always image at least one square area of 16 intersections at once. It might also be the case that the pen 300 can read the pattern if there is one discontinuity in each of the horizontal and vertical line spacings in the nine-intersection area, but not if there are two discontinuities in the spacing of either group of lines. In this case, if no errors are to be allowed, the discontinuities need to be arranged such that no square group of nine intersections 504 has two of the wider line spacings in either the horizontal or the vertical lines.

In another scenario it might be that the pen 300 cannot read the pattern unless it can identify a square group of nine intersections in which there are no discontinuities. In this case it is inevitable that some images will produce errors. However, the pen 300 is arranged such that it can construct valid pen stroke data provided there are few enough imaging errors, for example not more than one missed sample in every five. In this case the discontinuities need to be spaced such that, for all reasonable speeds of pen movement, at least four out of five samples will produce an image that can be read.

Referring to FIG. 6*a*, the pattern of FIG. 5 can also be represented in a different manner from that of FIG. 6. In this case, each intersection is represented by a figure from 0 to 3. The nominal position for each intersection is defined as a predetermined integer number of printer resolution spacings from the intersection above and the intersection to the left. As in FIG. 6, a 1 indicates that the intersection, and associated dot, is moved one printer resolution spacing to the right, a 2 that it is moved down, and a 3 that it is moved to the right and down, relative to the nominal position. The numbers for each intersection therefore represent the spacing of that intersection from the adjacent intersections to the left and above. This results in the pattern of FIG. 5 being represented by a table as shown in FIG. 6*a*.

In the example of FIG. 5, the discontinuity in the spacing of the intersections occurs at the same place in each row of the cell, and the same place in each column. The means that, for some areas of the pattern, the grid spacing is constant, and equal to an integral number of printer resolution spacings. However, if the printer resolution is high enough the spacing discontinuities can be distributed more randomly within the cell. In this case each row or column of intersections does not need to be a straight line, but can be distributed on either side of an 'average' line.

Figure 8:
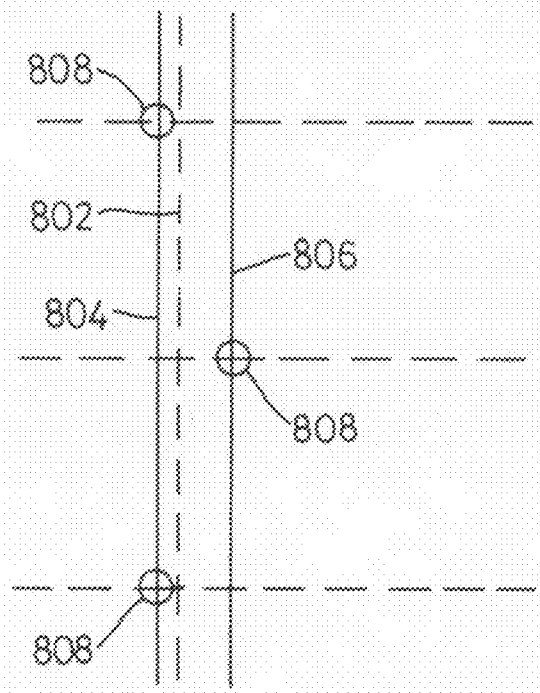
FIG. 8 shows part of an area of pattern on a document according to a further embodiment of the invention.

Referring to FIG. 8, a series of required grid line positions are defined at regular 300 μm intervals. These will not coincide with the printable intersection positions. For example a required vertical grid line position 802 falls between two possible parallel printable lines 804, 806, but is nearer to one of them 804 than the other 806. In this case the grid intersection points 808 can be varied along the line 802 in a random sequence, but so that more of them fall on the printable line 804 than on the printable line 806. The ratio of the number of intersections on the two printable lines 804, 806 determines the position of the 'average' grid line position 802 as detected by the pen. This can be controlled so that the spacing of the averaged grid line positions is not an integral number of printer resolution spacings. In this case the spacing between the intersections would vary across the document from one pattern dot to the next, rather than only every few dots as in the previous example.

One example of an algorithm that can produce the pattern of FIG. 8 will now be described. Firstly the required correction frequency, i.e. the average number of grid lines between each spacing discontinuity, is noted as 5. For each cell of five by five intersections, the horizontal spacings are first determined. The spacings are recorded using the notation of FIG. 6a. For each intersection a random number generating function is used that generates a number between 0 and 1. If the number is less than ⅕ then a 0 is recorded for the intersection, indicating a 'nominal' horizontal spacing. If it is greater than ⅕ then a 1 is recorded for the intersection, representing an increased spacing or discontinuity. A similar function is used to generate a 0 or a 2 indicating a nominal or increased vertical spacing. For each intersection the two numbers generated are added to define the spacing for that intersection, from the intersections above and to the left of it. This is then repeated for each of the cells of 25 intersections, to build up an area of spacings large enough for, for example, a single page of pattern.

It will be appreciated that this produces a random variation in spacing, with an average horizontal and vertical spacing equal to that of the pattern of FIG. 5.

In order to ensure that the pen can read the pattern, the density of the 1s, 2s and 3s in the table needs to be checked, for areas of the pattern equal to the size of the imaged area of the pen. If it is too high or too low in such an area, then the average grid spacing in that area will be outside the range acceptable to the pen. For any area where this is the case, the random numbers are re-generated to produce a different table and, provided these are within the pen's tolerance, the new values are used.

Rather than generating a completely new table defining the spacings for each cell of the required pattern area, a single table for one cell can be generated. Then, for each other cell, one intersection from the first cell can be selected using a random number generating algorithm, and the values for the table for the new cell produced using the spacing values from the first cell, shifted so as to start with the randomly identified intersection and wrapped.

In one example that could be used with current printer resolutions and known grid spacing of 300 μm and a 600 dpi printer, a nominal grid spacing of 7 printer resolution spacings is required, giving a nominal grid spacing of 0.29633 mm. Then two extra printer resolution spacings need to be added every 23 lines, to give an average grid spacing of 300 μm. The methods described above can therefore be used with a cell size of 23 by 23 intersections, and with an average of 2 increased horizontal and two increased vertical spacings in each cell.

For any printer resolution and pattern specification, the positions of all the discontinuities for a single page, or more specifically the largest area of pattern that will be required on a single page, only need to be calculated once. Once they have been calculated, they can be stored in the form of an array of offset positions, similar to that of FIG. 6 or FIG. 6a. This array can then be applied to any page of pattern that is printed. Therefore the fact that the methods of deriving the pseudo-random intersection positions described above are time consuming does not matter, as it does not need to be carried out each time a page of pattern is to be printed.

Printers with a 1200 dpi resolution are also common and have dot spacing of approximately 21.16 μm. They can therefore also print at a grid spacing of 14 times that dot spacing, i.e. 296.33 μm. Other commonly used printers have resolutions based on multiples of 72 dpi. These will not be able to print pattern with the same 296.33 μm grid spacing, but for example those with resolutions of 576 dpi (8×72 dpi) have a printer dot spacing of about 44 μm, which is similar to the 42.33 μm spacing of a 600 dpi printer. A printer with a 576 dpi resolution can therefore print pattern at a grid spacing similar to 296.33 μm, which the pen 300 will therefore be able to process. The only difference is that the discontinuities in the grid spacing will occur at different intervals.

Figure 9:
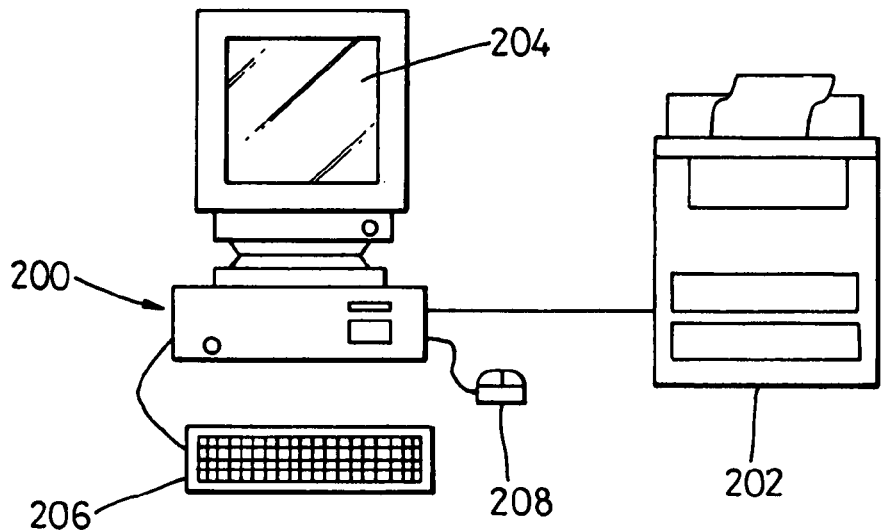
FIG. 9 shows a computer system according to an embodiment of the invention arranged to produce, and to process information from, the document of FIG. 1.
Figure 10:
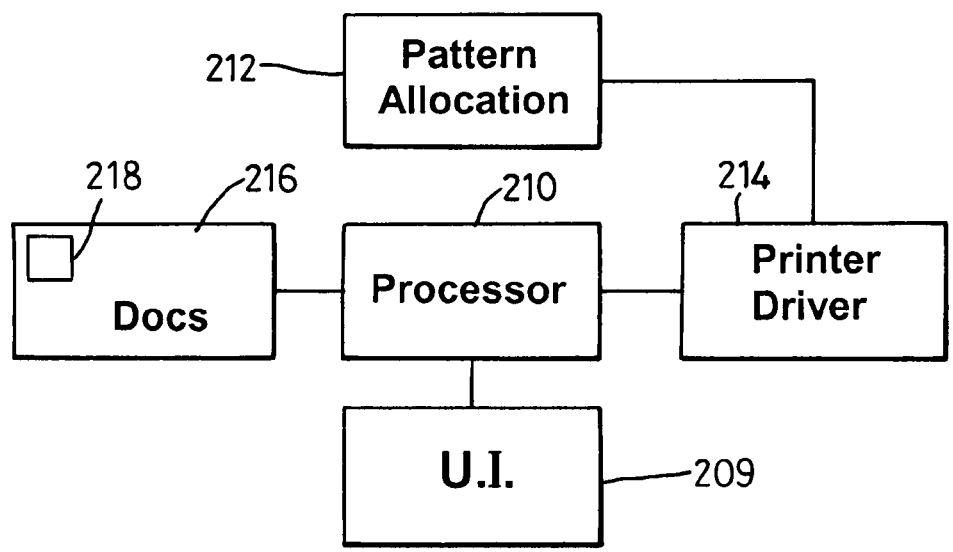
FIG. 10 shows functional units of the system of FIG. 9.

Referring to FIG. 9, a very simple system for producing printed documents having the position identifying pattern on them comprises a personal computer (PC) 200 and a printer 202. The PC 200 has a screen 204, a keyboard 206 and a mouse 208 connected to it to provide a user interface 209 as shown generally in FIG. 10. As also shown in FIG. 10, the PC 200 comprises a processor 210 and a pattern allocation module 212 which is a software module stored in memory. The pattern allocation module 212 includes a definition of a total area of pattern space and a record of which parts of that total area have been allocated to specific documents, for example by means of coordinate references. The PC 200 further comprises a printer driver 214, which is a further software module, and a memory 216 having electronic documents 218 stored in it. The user interface 209 allows a user to interact with the PC 200. The printer driver 214 has stored in it a table of intersection positions as shown in FIG. 6 for an area of pattern space large enough to cover the whole of one page of the document 100. As this table is specific to 600 dpi printers, the printer driver 214 also has stored in it similar tables for other printer resolutions, to enable the document 100 to be printed on a range of different printers.

In practice the various components of the system can be spread out over a local network or the internet. For example the pattern allocation module 212 can be provided on a separate internet connected server so that it can be accessed by a number of users.

In order to produce the printed document 100 the processor 210 retrieves an electronic document 218 from the memory 216 and sends it to the printer driver. The electronic document 218 contains a definition of the content 109, and the areas of the document 100 which are to have the pattern 108 printed on them. The printer driver 214 requests the required amount of pattern from the pattern allocation module 212 which allocates by means of coordinate references an area of the pattern space to the document, generates the pattern 108 for that area using a pattern generation algorithm, and communicates the details of the pattern including the positions of all the required dots, back to the printer driver 214. The printer driver 214 then identifies the resolution of the printer 202 that is to be used to print the document, and modifies the original pattern generated by the pattern allocation module 212 so that it can be printed by that printer. In order to do this the printer driver 214 identifies the nominal intersection positions that can be produced using the printer 202, e.g. from a table stored in memory, and then, using the table of corrections stored in memory, determines the modified intersection positions that will scale the pattern to produce the average 300 μm grid spacing. It then combines these with the dot offsets for each of the pattern dots from its respective intersection to determine the positions of all of the dots of the pattern.

The printer driver 214 then combines the content 109 and the pattern 108 into a single file which contains an image including the pattern and the content, converts the content 109 and the pattern 108 to a format suitable for the printer 202, and sends it to the printer which prints the content 109 and the pattern 108 simultaneously as a single image.

It will be appreciated that other data encoding patterns can be produced according to the invention. Essentially any pattern that is made up of elements, particularly if they are arranged in an array, can be produced in this way. For example, in some patterns the pattern elements are in a simple square array, and data is encoded by varying the size or shape of the elements. Such a pattern defines a grid, and the spacing of the elements defines, and can be considered as being the same as, the grid spacing. The spacing of the elements can be varied in an irregular manner, as in the embodiments described above, to avoid the banding effect of FIG. 4.

The invention claimed is:

1. A product having a data encoding pattern printed thereon, the pattern defining a grid having a grid spacing, wherein the grid spacing has discontinuities arranged to compensate for a mismatch between a resolution at which the pattern is printed and a required value for the grid spacing, the discontinuities being irregularly spaced across the product.

2. A product according to claim 1 wherein the pattern is made up of cells each of which has on average the same number of discontinuities within the cell, the position of the discontinuities within the cells varying between the cells in an irregular manner.

3. A product according to claim 2 wherein the discontinuities in grid spacing are arranged to produce discontinuities in individual grid lines of the grid.

4. A product according to claim 2 wherein the grid has grid lines spaced by a grid spacing in a grid spacing direction, and the discontinuities in the grid spacing are irregularly spaced in the grid spacing direction.

5. A product according to claim 2 wherein the discontinuities are arranged to produce an average grid spacing equal to the required value.

6. A product according to claim 1 wherein the discontinuities in grid spacing are arranged to produce discontinuities in individual grid lines of the grid.

7. A product according to claim 6 wherein the grid has grid lines spaced by a grid spacing in a grid spacing direction, and the discontinuities in the grid spacing are irregularly spaced in the grid spacing direction.

8. A product according to claim 1 wherein the grid has grid lines spaced by a grid spacing in a grid spacing direction, and the discontinuities in the grid spacing are irregularly spaced in the grid spacing direction.

9. A product according to claim 1 wherein the discontinuities are arranged to produce an average grid spacing equal to the required value.

10. A product according to claim 1 wherein the grid has two orthogonal sets of lines, each set having a respective line spacing, each line spacing having discontinuities that are irregularly spaced across the product.

11. The product of claim 1, wherein a discontinuity comprises at least one additional unit of resolution to form the grid spacing.

12. A method of generating a data encoding pattern for application to a document, the pattern being made up of elements, the method comprising defining a grid having a grid spacing, and defining positions of the elements relative to the grid, wherein the grid spacing is arranged to have discontinuities the positions of which vary in an irregular manner across the pattern such that the discontinuities compensate for a mismatch between a resolution of a printer to print the pattern and the grid spacing.

13. A method according to claim 12 comprising defining a plurality of cells of the pattern, defining a number of discontinuities for each cell, and determining the positions of the discontinuities within the cells.

14. A method according to claim 13 wherein the defined number of discontinuities is an average number of discontinuities for each cell, such that the actual number of discontinuities can vary from one cell to the next.

15. A method according to claim 13 wherein the number of discontinuities in each cell is predetermined.

16. A method according to claim 15 wherein the number of discontinuities in each cell is equal.

17. A method according to claim 13 including using a randomizing function to determine the positions of each of the discontinuities.

18. A method according to claim 12 comprising generating an area of pattern defining the positions of the elements in the pattern, defining the positions of the discontinuities for the area, and combining the positions of the elements and the positions of the discontinuities to produce the pattern having the irregularly varying discontinuities.

19. A method according to claim 18, the method comprising printing the pattern onto the product using a printer.

20. A method according to claim 19 wherein the discontinuities are arranged to produce an average grid spacing that is not an exact multiple of the resolution of the printer.

21. The method of claim 12, wherein a discontinuity comprises at least one additional unit of resolution between two subsequent elements.

22. A system for generating a data encoding pattern for application to a product, the system being arranged to generate pattern comprising a number of elements defining a grid spacing, and to modify the pattern so that the grid spacing has discontinuities arranged to compensate for a mismatch between the resolution at which the pattern is printed and a required value for the grid spacing, the discontinuities being irregularly spaced across the pattern.

23. A method for printing a data encoding pattern, the method comprising:
with a printing system, printing a grid of elements onto a product, the elements being offset from nominal positions within the grid to form an encoding pattern, said grid having a pre-defined grid spacing;
wherein, a spacing of the grid includes discontinuities randomly placed along a dimension of the product, the discontinuities comprising an additional unit of resolution between two of the elements in addition to any offset of the elements, said additional unit of resolution to compensate for a mismatch between a value of the unit of resolution and the grid spacing.

* * * * *